(No Model.)

L. E. BAUER.
STOOL.

No. 546,129. Patented Sept. 10, 1895.

—WITNESSES—

Dan'l Fisher
Elmer V. Potter

—INVENTOR—

Leonora E. Bauer,
by G. H. W. T. Kraus,
atty.

ANDREW B.GRAHAM. PHOTO-LITHO. WASHINGTON, D.C.

UNITED STATES PATENT OFFICE.

LEONORA E. BAUER, OF BALTIMORE, MARYLAND.

STOOL.

SPECIFICATION forming part of Letters Patent No. 546,129, dated September 10, 1895.

Application filed June 11, 1895. Serial No. 552,373. (No model.)

*To all whom it may concern:*

Be it known that I, LEONORA E. BAUER, of the city of Baltimore, in the State of Maryland, have invented certain Improvements in Stools, of which the following is a specification.

This invention relates to certain improvements in a stool especially adapted for use behind the counter of a store where the space is limited; and it consists in a novel construction of the stool, whereby the seat thereof when not occupied is retained in a vertical position, and thereby forms only a slight obstruction to the movement of the saleswomen in the rear of the counter, as will hereinafter fully appear.

In the further description of the said invention which follows reference is made to the accompanying drawings, forming a part hereof, in which—

Figure 1:
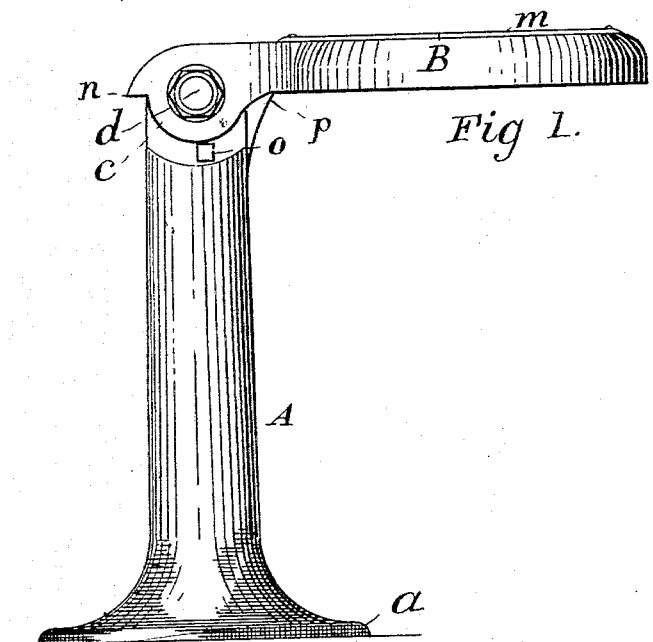
Figures 2, 3:
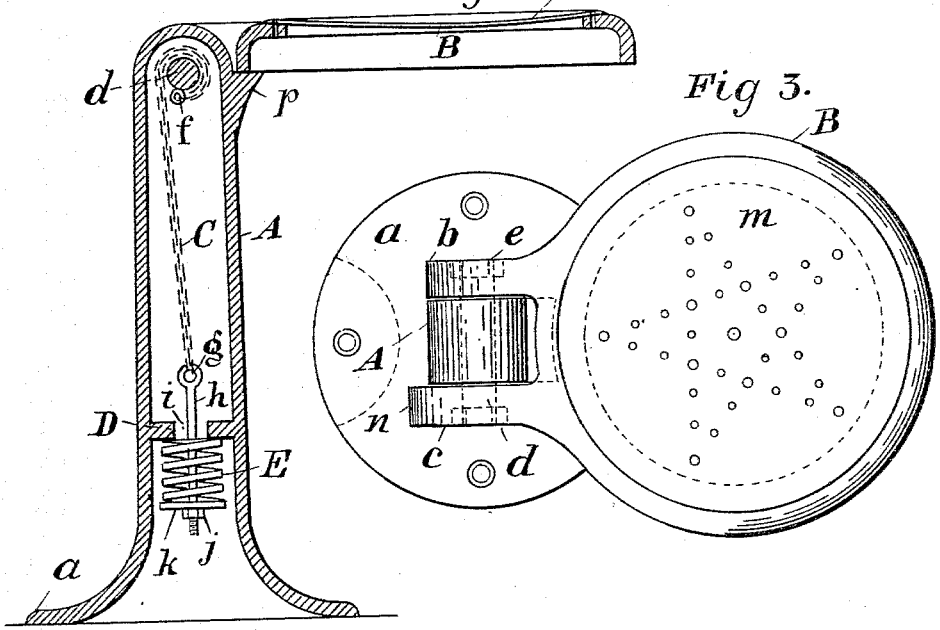

Figure 1 is an exterior side view of the improved stool, and Fig. 2 a vertical section of the same. Fig. 3 is a top view of Fig. 1.

Referring now to the drawings, A is a column having a base-flange $a$, whereby it is secured to the floor of the store.

B is the seat, shown as circular in shape with two lugs $b$ and $c$, which are hinged to the upper end of the column by means of a bolt $d$. The head and nut of the bolt $d$ are in recesses or depressions, so that they will not extend beyond the face of the lugs $b$ and $c$ and catch the clothing. The head $e$ of the bolt, being in a recess of the same size and shape as the head, turns with the seat, and the bolt has an eye $f$, to which a chain C is attached. This chain is rove around the bolt, and its lower end is attached to an eye $g$, forming the termination of a screw-bolt $h$.

The column A has an internal annular projection D, and the screw-bolt $h$ passes through the central space $i$. Between the projection D and the nut $j$ of the bolt is a spiral spring E and a washer $k$.

The seat B is preferably made hollow, as shown, to give lightness, and is annular in form and covered with a perforated wood or veneer bottom $m$.

The flange of the column may be cut away, as shown by the dotted line in Fig. 3, to admit of the stool being placed close to a column which supports the roof, should such situation be necessary.

A lip $n$ on the lug $c$, in connection with a stop $o$, serves to prevent the seat from turning back beyond a vertical line, and a second stop $p$ supports the seat when it is in a horizontal position.

The nut $j$ is screwed up until the tension of the spring is sufficient to keep the seat in a vertical position when not in use.

The seat is easily turned down to a horizontal position when it is to be used, and when the occupant rises the seat immediately assumes its normal or vertical position, where it occupies very little more room in a direction longitudinally of the counter than the column alone.

I claim as my invention—

In a stool, the combination of a column, a hinged seat, a bolt having a movement in common with the seat, a chain attached to the bolt, a spring with adjusting devices connected to the lower end of the chain, means to hold the spring in position, and a stop to prevent the seat from passing below a horizontal position, substantially as specified.

LEONORA E. BAUER.

Witnesses:
 DAVID FISHER,
 ELMER V. POTTER.